United States Patent [19]
Lambeth

[11] 4,220,971
[45] Sep. 2, 1980

[54] RECIPROCATING DROPOUT COMPENSATOR

[75] Inventor: David N. Lambeth, Webster, N.Y.

[73] Assignee: Eastman Kodak Company, Rochester, N.Y.

[21] Appl. No.: 824,137

[22] Filed: Aug. 12, 1977

[51] Int. Cl.² .............................................. H04N 5/14
[52] U.S. Cl. ................................... 358/160; 358/163; 358/167
[58] Field of Search ........................ 358/160, 167, 163

[56] References Cited

U.S. PATENT DOCUMENTS

| | | | |
|---|---|---|---|
| 3,699,246 | 10/1972 | Hodge | 358/160 |
| 3,825,680 | 7/1974 | Verhoeven | 358/167 |
| 3,863,022 | 1/1975 | Bruch | 358/160 |
| 3,904,818 | 9/1975 | Kovac | 358/160 |

*Primary Examiner*—Richard Murray
*Attorney, Agent, or Firm*—Thomas H. Close

[57] ABSTRACT

A compensator for inserting a signal segment into a video signal in substitution for a signal segment that is detected to be impaired is particularly adapted to use with discrete-sample-type video signals as, for example, may be derived using an imager having a grid of elemental imaging areas. Such compensator includes first and second registers that are capable of receiving new data in one mode and reading out data with recirculation thereof in a second mode. In operation, the registers reciprocate from one mode to the other on a scan-line by scan-line basis, but reciprocation is cancelled upon detection of a dropout or other signal impairment. Cancellation of a mode change automatically results in an insertion of recirculated information for a previous scan line.

5 Claims, 3 Drawing Figures

SIMPLIFIED TIMING DIAGRAM

RECIPROCATING DROPOUT COMPENSATOR

BACKGROUND OF THE INVENTION

1. Field of the Invention

The invention relates to apparatus for compensation of dropouts and other signal impairments to video signals.

2. Description Relative to the Prior Art

In the processing of video signals, particularly where record/playback operations are involved, unpredictable impairments to segments of the video signal, such as dropouts, tend to occur. These signal impairments often produce obvious and irritating artifacts in a final video display.

It is known that to detect such impairments and then replace the afflicted signal segment, e.g. a line scan segment, with a neutral intermediate tone level will reduce the degree of defect objectionability. It is also known to replace such segments with preceding similar segments which have been purposely delayed, e.g. replace a line of picture information with a preceding line (see U.S. Pat. No. 2,996,576). One problem with this latter approach is that the delay must be accurate or else lateral line shifting, in effect, occurs with resultant non-alignment of vertical detail.

SUMMARY OF THE INVENTION

Accurately timed substitution of a prior line segment of video signal for a line segment detected to be impaired is provided by a cooperating pair of analog registers that reciprocate between one mode for receiving a line segment of a video signal and a second mode for readout and recirculation of such a received segment. In the event of a detected signal impairment, say a dropout, the mode change is cancelled and a recirculated signal segment is automatically sent out.

In a preferred implementation, the registers receive a discrete-time ("box car") video signal and the size of the registers is so selected as to correspond to the number of discrete samples that occur for a video line. Such video signals are, it will be appreciated, of the type which may be derived using an elemental area type imager with row-by-row readout; and register length for signals so derived is selected in accordance with the number of imager elements in a row. By using registers that are so sized a time correspondence is conveniently maintained as signals for successive rows are processed.

To improve vertical alignment of lines still further, the invention contemplates the use of respective clocks for mode 1 and mode 2 that have different rate-of-response characteristics; more specifically, the mode 1 (signal input) response is selected to be faster than the mode 2 (signal output) response in order to introduce a degree of flutter compensation.

The invention will be described in detail with reference to the drawings wherein.

Figure 1:
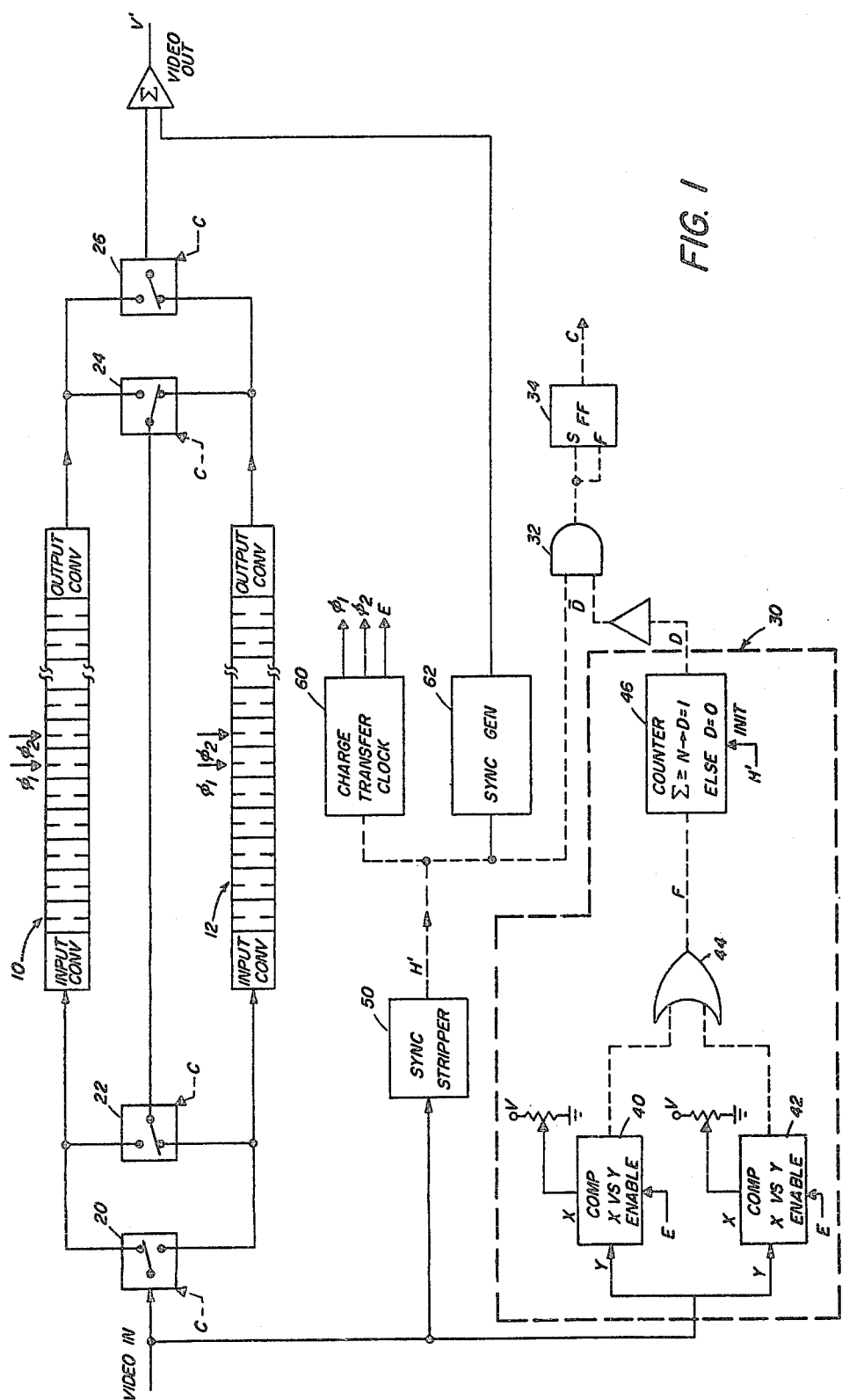
FIG. 1 is a diagram, in block form, representing a presently preferred compensator arrangement according to the invention.

Referring to FIG. 1, two analog registers 10 and 12, respectively, are connected to receive a video signal V. Preferably the signal V represents a succession of line scans and has a discrete-time format. The registers 10 and 12 are then chosen to have a length corresponding to the number of discrete samples that occur along a line scan. For example, if the signal is produced by an elemental-area-type imager having 250×250 elements then a register length M equal to the number of elements in an imager row would be selected (i.e. M=250). As illustrated, the registers 10 and 12 are of the charge-transfer type and require two-phase clocking to advance signal information from stage to stage (broken lines are used for indicating the two separate charge wells of a register element). Input and output circuits are indicated for the registers 10 and 12, such circuits, respectively, serving to convert the incoming signal into charge packet form and to convert from charge packet form back to a conventional analog signal. Typically, such circuits or "structures" are formed integrally with the register, see Sequin and Tompsett *"Charge Transfer Devices"*, pp 47–59, Academic Press, 1975. In the presently preferred implementation of the invention a set of four signal-controlled analog switches (denoted 20, 22, 24 and 26) is used to control signal flow for producing reciprocating operation according to the invention. The switch 20 directs the flow of incoming video signal information to either register 10 or 12 in an alternating sequence and operation involving the receipt of new video information by a register will hereinafter be referred to as mode 1 operation (as illustrated the register 10 is connected for mode 1 operation).

The switches 22, 24 and 26 are controlled to direct signal flows for the other register, i.e. the register (illustrated as the register 12) that is not coupled through the switch 20 for mode 1 operation.

Such other register operates in what will be referred to as mode 2, which involves the output of stored video information through the switch 26 along the recirculation of that same video information through the switches 24 and 22 for purposes of storage. As is a standard practice, delay devices would be added as required to compensate for signal transit time differentials.

According to the invention the registers 10 and 12 reciprocate between mode 1 and mode 2 operation on a line-by-line basis. Such reciprocation is achieved in the presently preferred implementation under the control of a signal C. The signal C changes state from one line to the next for reversing the switches 20, 22, 24 and 26, but such change of state is cancelled in situations where a signal impairment is detected (see FIG. 2). Exemplary apparatus for producing the control signal C includes a defective-signal detector 30, an AND gate 32, and a flip-flop 34 (dashed lines are used to indicate paths for binary signals).

Figure 2:
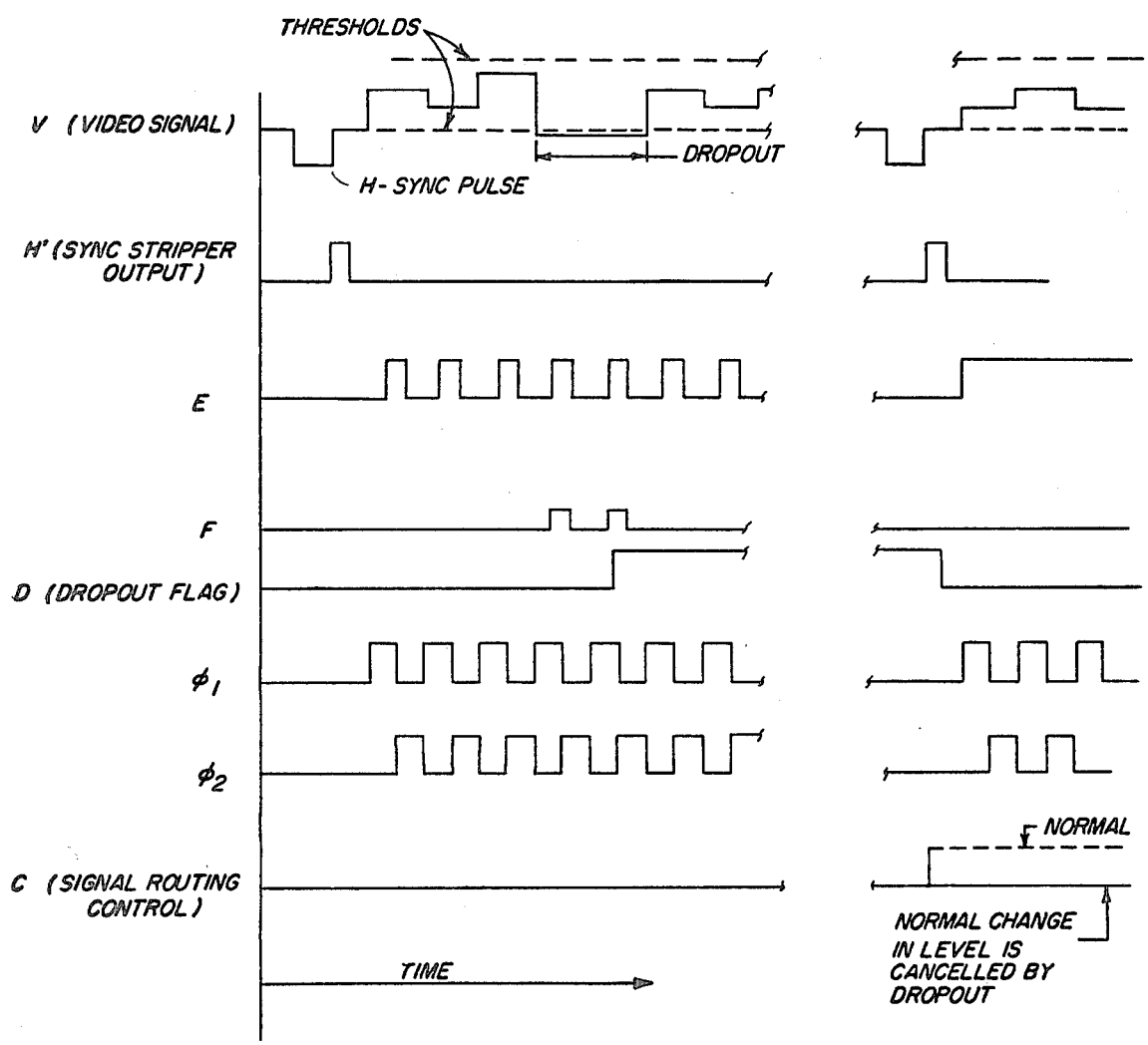
FIG. 2 is a diagram indicating signal timing for the presently preferred arrangement according to the invention.

To detect defective-signal segments for the illustrated implementation, two threshold detectors 40 and 42 are employed (see illustration for the signal V in FIG. 2) which detectors are enabled by a signal E at intervals during the discrete pulses of the signal V (see FIG. 2 illustrations for signals V and E). If the signal V falls outside the thresholds, a signal pulse F passes through an OR gate 44 to a counter 46. The counter is initialized for each line scan and if, during a line scan, a preselected number of pulses occur (say N=2) the output signal D goes true and the inverse signal $\overline{D}$ goes false. Under "normal" conditions $\overline{D}$ is true; and also the line sync pulse of the video signal V produces a "true" pulse from a stipper 50 i.e. produces a pulse in the signal H'. Hence under normal conditions the H' pulse passes through the AND gate 32 and changes the output signal C of flip-flop 34 (which in turn changes the position of controlled switches 20, 22, 24 and 26). In the event of a detected signal impairment the signal $\overline{D}$ goes false and no pulse is passed to the flipflop 34 for changing the level of the signal C (see FIG. 2). Since signal C does not change, the register modes do not reciprocate. Rather than send out the defective line information, as would occur with a shift to mode 2 operation, the mode 1 register remains in mode 1 and the defective information is disregarded as subsequent line information is read in. The other register remains in mode 2, there being no change in the signal C, and such register, without any change to mode 2 operation, automatically reads out the recirculated information which it has stored.

Control for signal flow within the registers 10 and 12 resides in a clock 60, which responds to pulses from the sync stripper 50 and produces phase signals $\Phi_1$, and $\Phi_2$ for causing charge-transfer as is well known in the art (see e.g. Sequin and Tompsett "*Charge Transfer Devices*", pp. 62–67, Academic Press 1975).

After the video signal passes through the switch 26, sync pulses from a generator 62, that responds to the sync stripper signal H', are inserted at a summer 64 to produce the signal V'.

Figure 3:
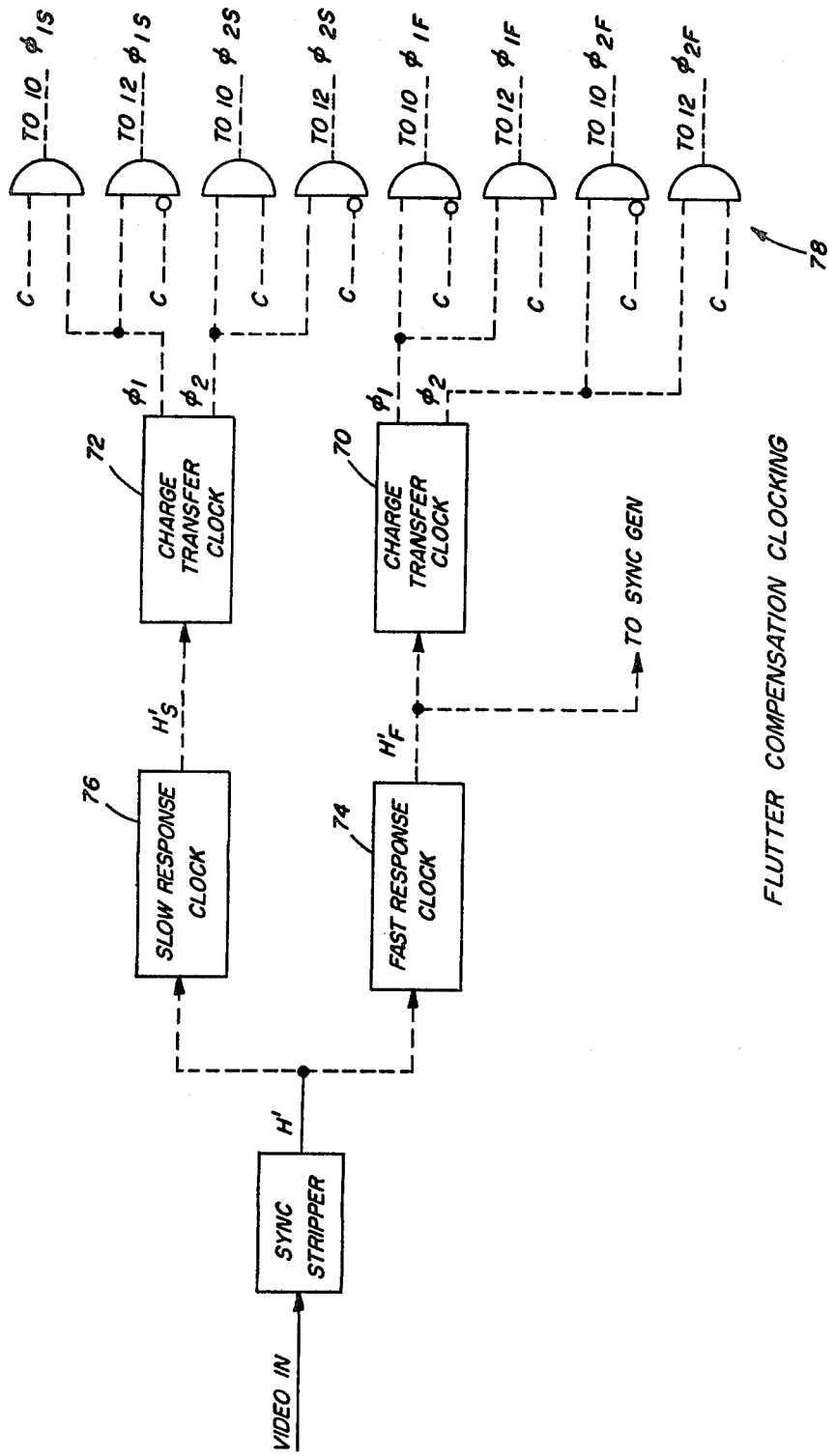
FIG. 3 is a diagram, in block form, of a register control circuit for introducing time base correction according to the invention.

Referring to FIG. 3, an alternative for increasing the time base stability of the final video signal V' involves the use of separate charge transfer clocks 70 and 72 for mode 1 and mode 2, respectively. The mode 1 clock is triggered by a "flywheel" clock 74, which may be a phase-lock type circuit, that responds relatively rapidly to changes in H-sync period. The mode 2 clock, on the other hand, is triggered by a "flywheel" clock 76 that responds relatively slowly to variations in H-sync period. Switching of the phase signals ($\Phi_{1S}$, $\Phi_{2S}$, $\Phi_{1F}$ and $\Phi_{2F}$) to the registers 10 and 12 respective of operating mode is effected by a set of AND gates 78 to which the switch control signal C is input. Such arrangement serve to average out the short term variations in H-sync period and hence introduces the additional function of time base correction.

A presently preferred implementation for the invention and an alternative providing increased time base stability have been described in detail with reference to the Figures; however, it will be appreciated that variations and modifications are possible which are within the spirit and scope of the invention. For example, registers that are not of the charge-transfer type may be employed and various means may be used for purposes of defective video signal detection. Also, the invention may be used in processing either monochrome or color video signals and the video signals may be in continuous analog or discrete-sample type analog or digital form.

What is claimed is:

1. Corrective apparatus for processing a video signal of the type having a succession of segments corresponding to line scans, where such segments may exhibit a detectable impairment, said corrective apparatus comprising:
(a) a first and a second shift register;
(b) means, responsive to said video signal, for activating signal transfer through said registers at a rate corresponding to the video line rate;
(c) switch control means, responsive to the video signal, for producing a control signal that normally alternates between a first state and a second state from one video signal segment to the next;
(d) video signal switching means, responsive to said first state of said control signal, for connecting said first register to receive a video signal segment for storage and for connecting said second register
  (1) to read out a stored video signal segment to an output channel, and
  (2) to recirculate such stored video signal segment for continued storage,
  said video signal switching means being responsive to said second state of said control signal to reverse the connections to said first and second registers;
(e) means for detecting an impaired video signal segment and for producing a defect flag signal in the event of a detection; and
(f) means, responsive to said defect flag signal, for disabling the state change of said control signal produced by said switch control means in the event of an impaired signal detection by said detection means, whereby the normal reversal in register connection is cancelled and a recirculated signal segment is substituted for the impaired signal segment.

2. Apparatus according to claim 1 wherein said means for activating signal transfer includes first signal advance clocking means which responds relatively rapidly to instantaneous changes in the video line rate, second signal advance clocking means which is less responsive to instantaneous changes in the video line rate, and clock switching means responsive to said control signal for connecting said first signal advance clocking means to that register which is receiving a video signal segment and for connecting said second signal advance clocking means to that register which is connected for readout to said output channel; whereby a degree of time base correction is achieved.

3. Corrective apparatus for processing a discrete video signal of the type having a succession of segments having M periodic line scan samples, where such segments may exhibit a detectable impairment, said corrective apparatus comprising:
(a) first and second analog shift registers having M storage locations each;
(b) means, responsive to said video signal, for activating signal advancement through said registers at a rate corresponding to the video sample rate;
(c) switch control means, responsive to the video signal, for producing a control signal that normally alternates between a first state and a second state from one video signal segment to the next;
(d) switching means, responsive to the first state of said control signal, for connecting said first register to receive a video signal segment for storage and for connecting said second register
  (1) to read out a stored video signal segment to an output channel, and
  (2) to recirculate such stored video signal segment for continued storage,
  said switching means being responsive to the second state of such control signal to reverse the connections to said first and second registers;
(e) means for detecting an impaired video signal segment and for producing a defect flag signal in the event of a detection; and
(f) means, responsive to said defect flag signal, for preventing a state change in said control signal in the event of an impairment detection by said detecting means, whereby the changeover in register operation is cancelled and a recirculated signal segment is substituted for the impaired video signal segment.

4. Apparatus according to claim 3 wherein said first and second analog shift registers are charge transfer devices which are responsive to relatively phase-shifted pulse signals to cause advancement of stored signal information, and said activating means is a clock device that responds to the video signal to produce pulse-type phase signals which occur at frequencies that are multiples of the video segment frequency.

5. A device for replacing impaired segments of a video signal of the type comprised of a periodic succession of segments that correspond to image line scans, said device comprising:

(a) a first and a second analog shift register;
(b) means, responsive to said video signal, for coordinating advancement of information through said registers at rates corresponding to the rate of occurence of video signal segments;
(c) means, responsive to the video signal, for producing at least one switch control signal that normally alternates between first and second states in synchronism with the video signal segments;
(d) first switch means for connecting said first register to receive the video signal in response to the first state of the switch control signal and for connecting said second register to receive the video signal for storage in response to the second state of the switch control signal;
(e) second switch means for connecting said second register to read out stored signal information and to recirculate such information for storage in response to the first state of the switch control signal, and for connecting the first register to readout stored signal information and to recirculate such information in response to the second state of the switch control signal; and
(f) detection apparatus, cooperating with said switch control signal producing means, which responds to a predetermined impairment characteristic of said video signal by cancelling the state change of said switch control signal.

* * * * *